United States Patent [19]
Pertics

[11] 3,747,515
[45] July 24, 1973

[54] DEVICE FOR STEMMING FRUIT

[76] Inventor: Emil Elias Pertics, P.O. Box 84, LaPaz, Ind. 46537

[22] Filed: Sept. 15, 1971

[21] Appl. No.: 180,818

Related U.S. Application Data

[63] Continuation-in-part of Ser. No. 58,068, July 24, 1970, Pat. No. 3,680,618.

[52] U.S. Cl. .................................................. 99/640
[51] Int. Cl. ............................................ A23n 15/02
[58] Field of Search .................. 146/55, 17 A, 17 R; 99/640

[56] References Cited
UNITED STATES PATENTS

| | | | |
|---|---|---|---|
| 3,519,049 | 7/1970 | Tomelleri | 146/55 |
| 3,036,613 | 5/1962 | Minera | 146/55 |
| 2,308,038 | 1/1943 | Ashlock, Jr. | 146/17 A |
| 2,383,268 | 8/1945 | Morgan | 146/55 X |
| 1,835,190 | 12/1931 | Stansbury | 146/55 |
| 3,680,618 | 8/1972 | Pertics | 146/55 |

FOREIGN PATENTS OR APPLICATIONS

| | | | |
|---|---|---|---|
| 1,277,230 | 10/1961 | France | 146/55 |

*Primary Examiner*—Willie G. Abercrombie
*Attorney*—James D. Hall

[57] ABSTRACT

A device for removing stems from fruit including an endless power driven belt consisting of a plurality of traverse parallel rollers and having upper and lower frame supported runs. Each roller along the upper run of the belt is caused to rotate in a direction opposite to the direction of rotation of the immediate roller on each side thereof. The fruit is deposited upon the upper run of the belt and as it advances along such run, the stems thereof are received between adjacent rollers and pulled from the fruit.

2 Claims, 10 Drawing Figures

INVENTOR.
EMIL E. PERTICS

ATTORNEYS

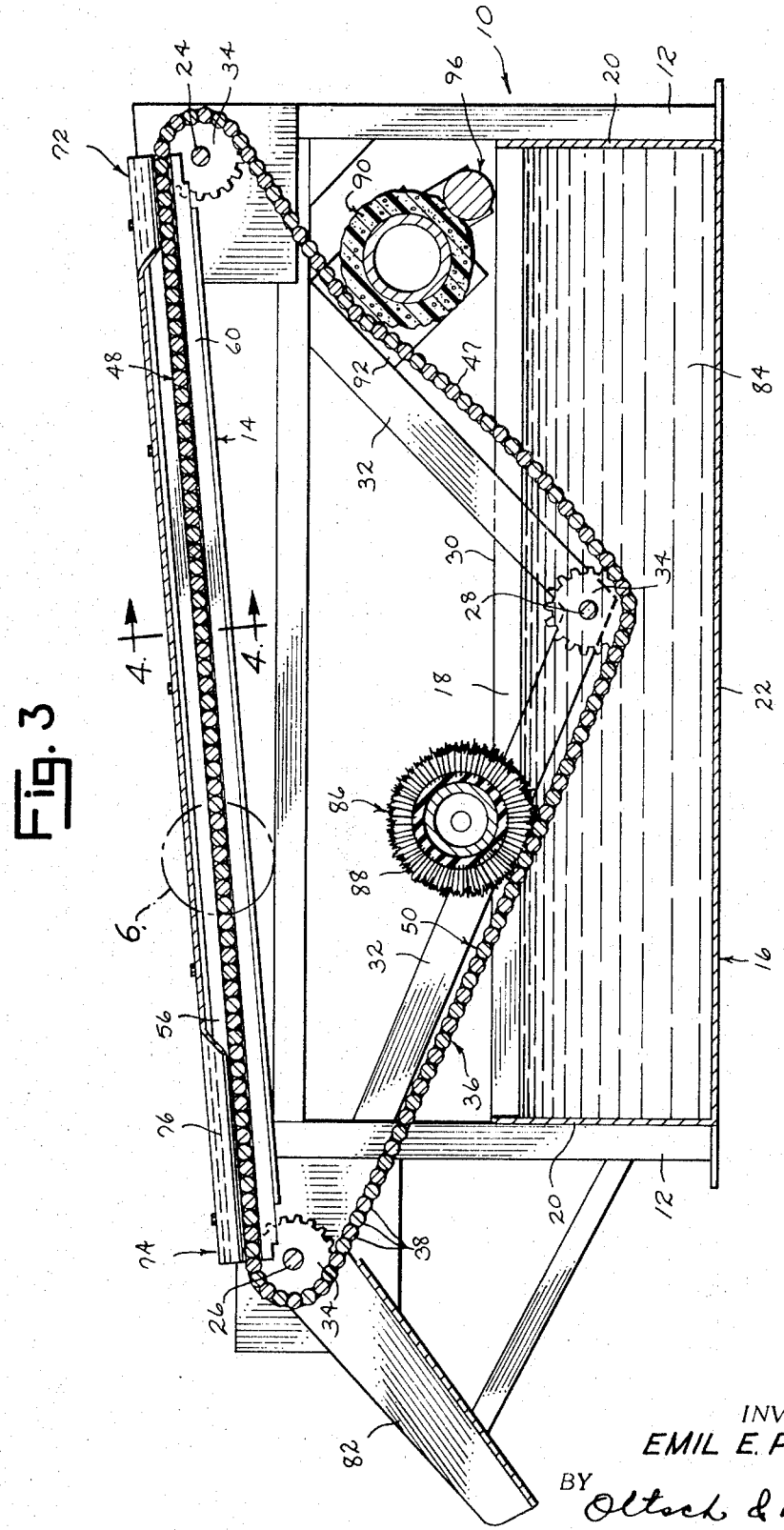

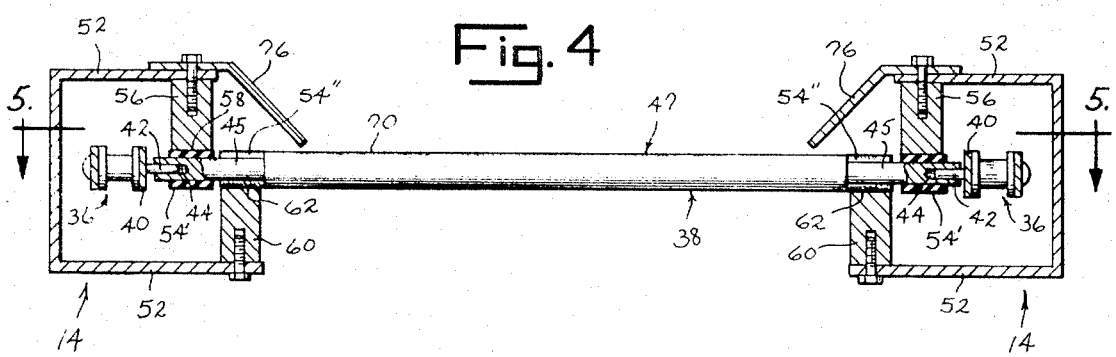
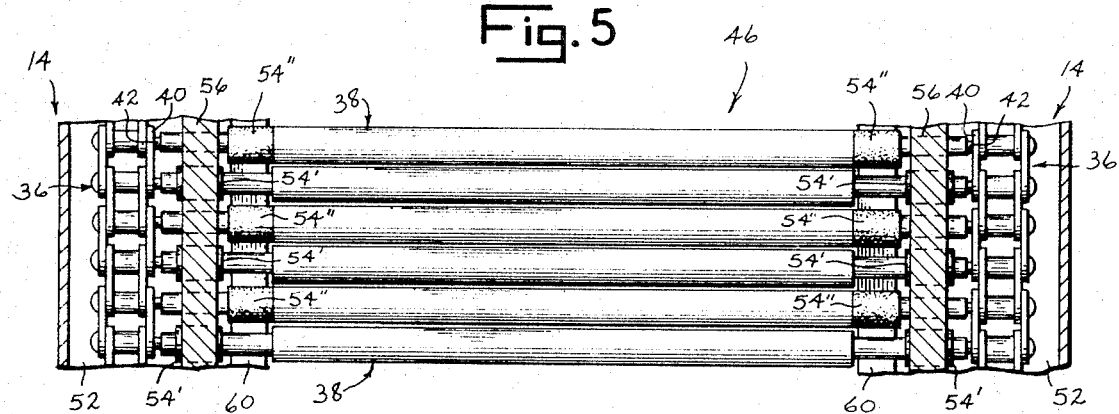
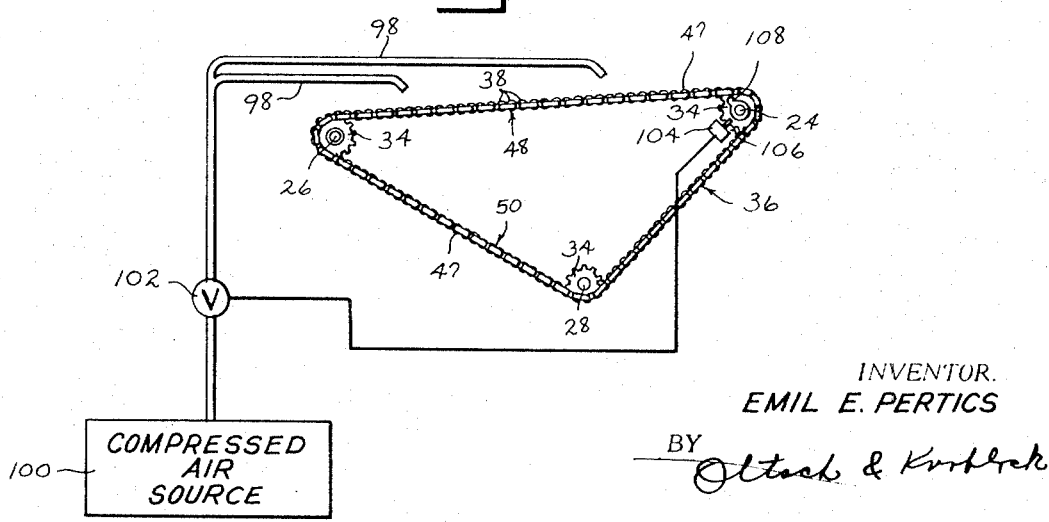

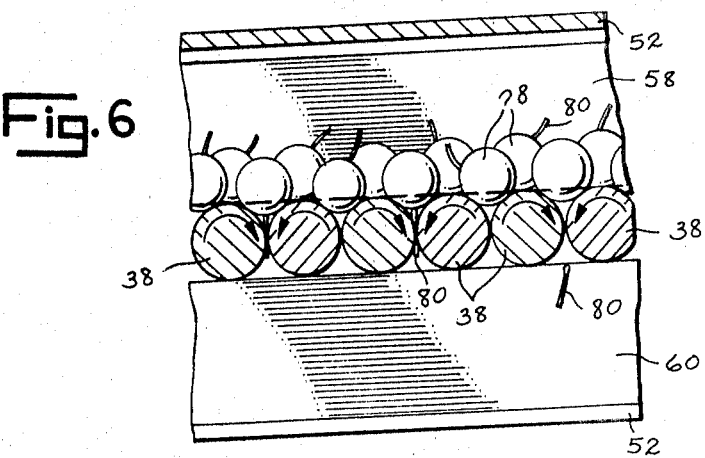
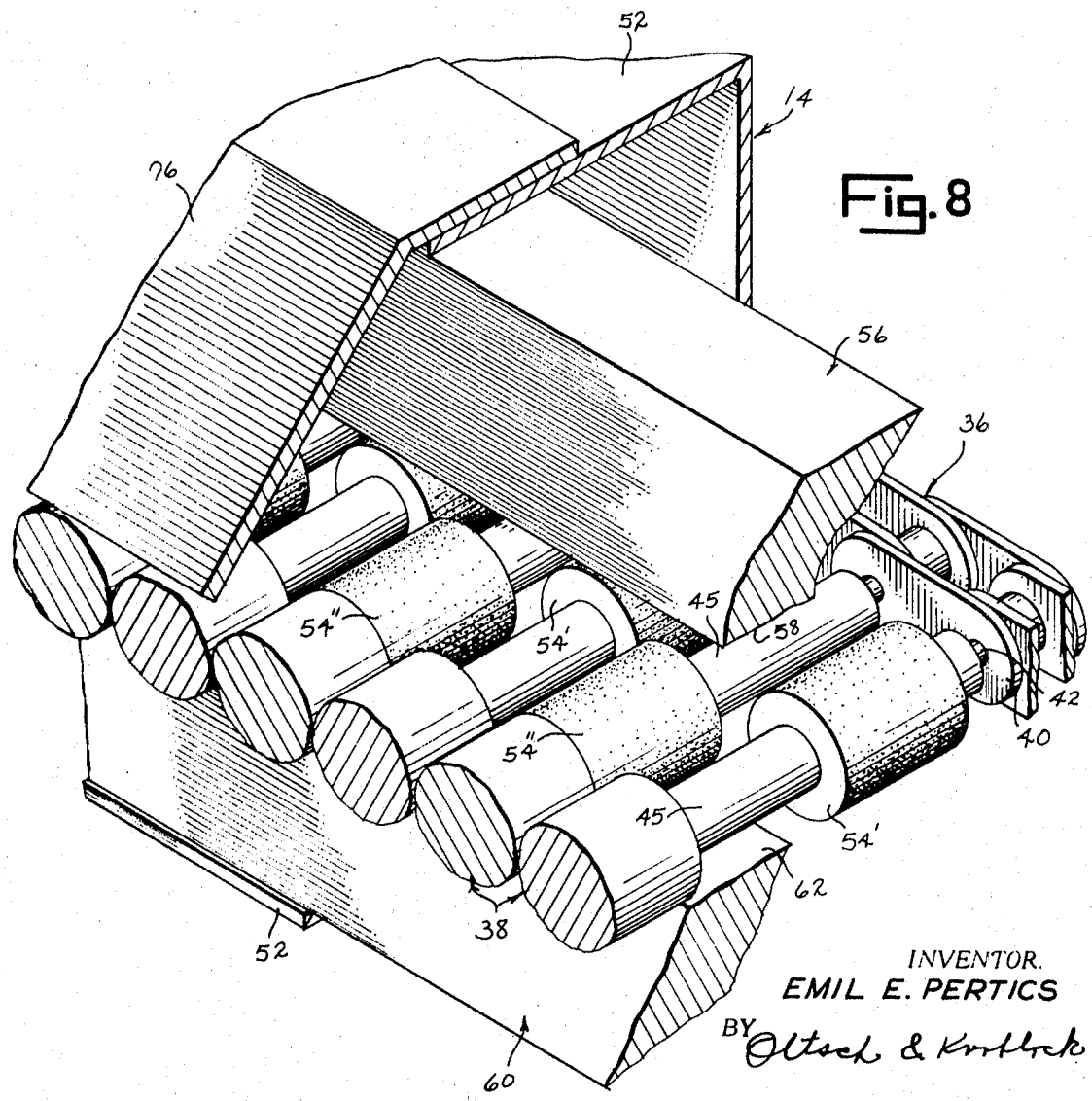
INVENTOR.
EMIL E. PERTICS

INVENTOR.
EMIL E. PERTICS
BY Oltsch & Kvrtlick
ATTORNEYS 3,747,515

DEVICE FOR STEMMING FRUIT

CROSS-REFERENCE TO RELATED APPLICATION

This is a continuation-in-part of my U.S. Application Ser. No. 58,068, filed July 24, 1970, now U.S. Pat. No. 3,680,618.

SUMMARY OF THE INVENTION

This invention relates to a device for stemming fruit.

The fruit stemming device of this invention includes a power driven endless belt having upper and lower runs. The belt is defined by a plurality of transversely extending parallel rollers. Means are provided for causing axial rotation of the rollers along the upper run of the belt wherein each roller rotates in a direction opposite to the direction of rotation of the immediate roller on each side thereof. When the fruit, such as blueberries or cherries, is deposited upon the upper run of the belt at the feed end thereof, the rotation of the rollers cause the stems of the fruit to be pulled between adjacent rollers and from the fruit as the fruit proceeds to the discharge end of the belt.

During the stem removal operation, experience has shown that some of the softer berries will be pulled between the rollers and thus crushed. To remove the juices, skin, and pulp of such crushed fruit from the rollers and those stems which do not fall from the belt during operation of the stemming device, means may be provided for subjecting a portion of the belt to a cleansing fluid which in conjunction with a brushing means removes the fruit remains from the belt. Means are further provided for drying the belt after contacting the cleansing fluid. As the fruit is carried along the upper run of the belt, rotation of the rollers causes the stems of the fruit to be drawn between adjacent rollers and pulled from the fruit. To facilitate the removal of the stems, means in addition to the rotation of the belt rollers may be utilized to cause the stems to be positioned to be pulled between the rollers.

Through the use of this invention, large quantities of fruit, such as blueberries, gooseberries, raspberries, and cherries, can be quickly and economically stemmed. The use of hand labor in the production of such fruit is kept at a minimum.

Accordingly, it is an object of this invention to provide a device for stemming fruit which is of economical construction and of simple maintenance.

It is a further object of this invention to provide a stemming device for fruit which has a high production capacity with small fruit loss.

Still another object of this invention is to provide a stemming device for fruit which is self-cleaning and which will not bruise or otherwise affect the appearance of the fruit.

Other objects of this invention will become apparent upon a reading of the invention's description.

BRIEF DESCRIPTION OF THE DRAWINGS

FIG. 3 is a sectional view taken along line 3—3 of FIG. 1.

FIG. 4 is a sectional view taken along line 4—4 of FIG. 3.

FIG. 5 is a fragmentary sectional view taken along line 5—5 of FIG. 4.

FIG. 6 is an enlarged fragmentary sectional view taken of the encircled portion of FIG. 3 and showing the stems being removed from the fruit.

FIG. 7 is a schematic view of a modified embodiment of the stemming device of my invention.

FIG. 8 is an enlarged perspective view of that portion of FIG. 1 which is encircled.

DESCRIPTION OF THE PREFERRED EMBODIMENTS

Figure 1:
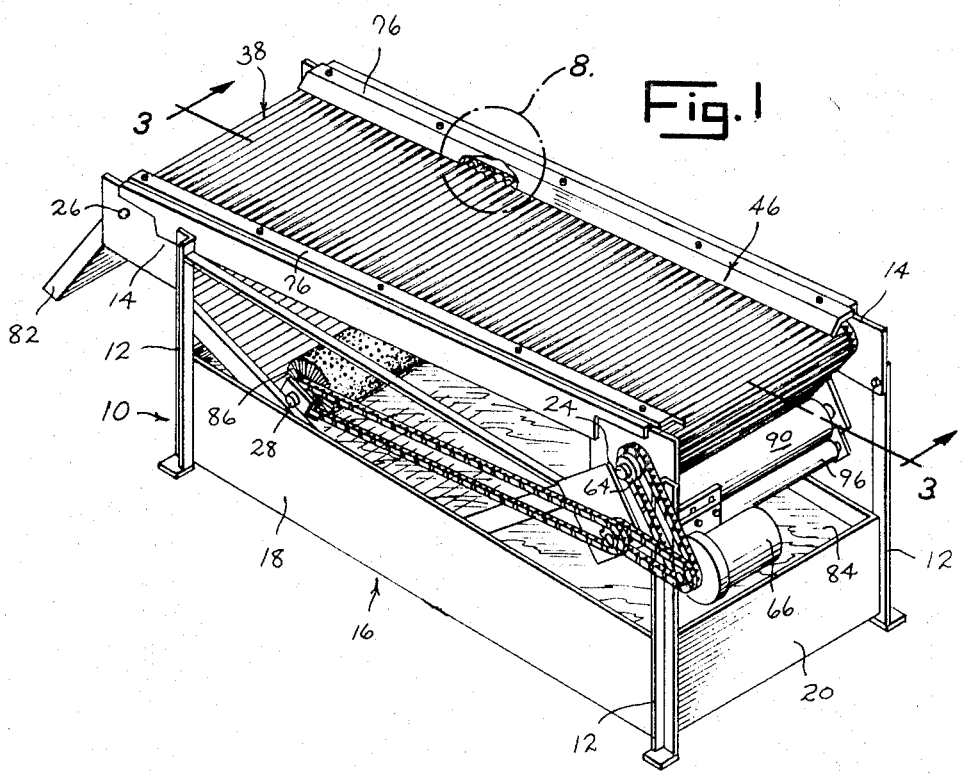
FIG. 1 is a perspective view of one embodiment of the stemming device of my invention with portions removed for purposes of illustration.
Figure 2:
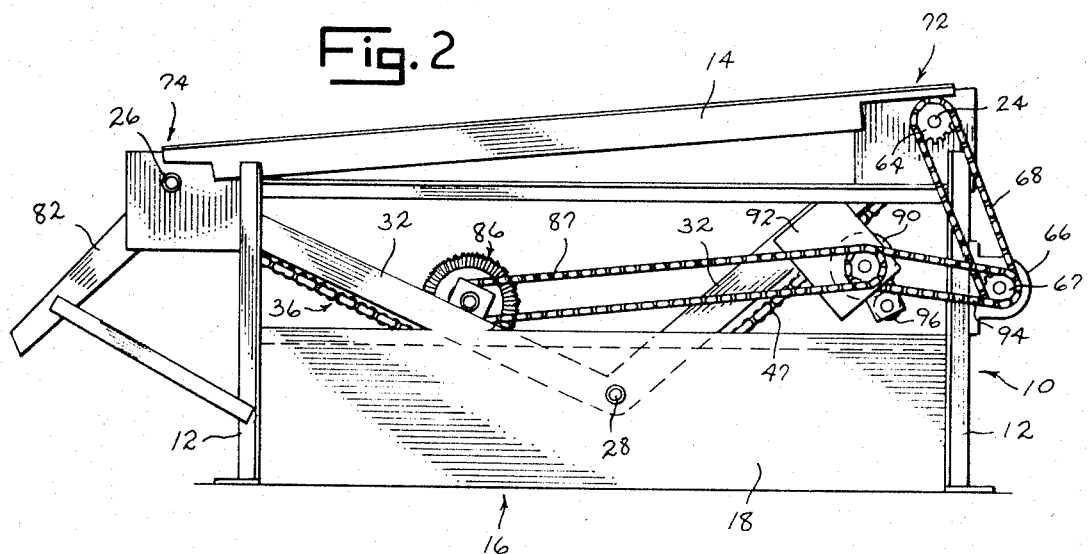
FIG. 2 is a side elevational view of the embodiment of my invention illustrated in FIG. 1.

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Referring to the embodiment of the fruit stemmer illustrated in FIGS. 1–6 and 8, the numeral 10 designates a support means or frame having corner stanchions 12 interconnected at their upper ends by longitudinally extending parallel plates 14. A tank 16, having side walls 18, end walls 20 and bottom 22, preferably forms the bottom of frame 10 and extends the full length and width of the frame. A shaft 24 extends transversely of frame 10 at one end thereof and has its end portions journaled within side plates 14. A like shaft 26 extends transversely of frame 10 at the opposite end of the frame from shaft 24 and has its end portions journaled within plates 14. Shafts 24 and 26 parallel each other and are preferably positioned with shaft 24 at a slightly higher elevation than shaft 26 as best illustrated in FIG. 3. A shaft 28 also extends transversely of frame 10 and parallels shafts 24 and 26. Shaft 28 is located between shafts 24 and 26 and is positioned below upper edge 30 of tank 16 with its end portions journaled within diagonal supports 32 which extend between stanchions 12 and side walls 18 of tank 16. Each of the shafts 24, 26 and 28 carries a pair of spaced sprockets 34 which are positioned at opposite ends of the shaft and between the planes of plates 14. Each group of three sprockets 34 at corresponding end portions of shafts 24, 26 and 28 lie in a common plane. An endless chain 36 is trained about each such coplanar group of sprockets 34.

Extending between endless chains 36 are a plurality of transverse rollers 38 each having the end portions thereof connected to opposed links 40 of chains 36. While the means of connecting each roller 38 to chains 36 may vary, one such connection means is illustrated in FIGS. 4 and 5. Each link 40 of chain 36 includes an inwardly projecting pin 42. An axial bore 44 is formed in each end portion 45 of each roller 38 and receives with slight diametrical clearance a chain pin 42. With both ends of each roller 38 so journaled upon opposite chain pins 42, the rollers are supported between chains 36 and are free to experience axial rotation relative to the chains. Rollers 38 parallel each other and are preferably spaced slightly apart. Rollers 38 cooperate with chains 36 to define an endless belt 46 having a roller-defined fruit conveying surface 47 and having an upper run 48 and a lower run 50 which extends into tank 16 and around sprockets 34 carried by shaft 28.

Each plate 14 includes, as best shown in FIG. 4, spaced, inwardly projecting flanges 52, which extend from adjacent shaft 24 to adjacent shaft 26 and which are positioned at opposite sides of the marginal edge of the belt. The end portions 45 of each roller 38 are reduced in cross section with each end portion carrying a sleeve 54 which is constricted about the roller and which is constructed of a material, such as rubber, having a high frictional characteristic. The outer diameters of sleeves 54 preferably approximate the diameters of rollers 38. Sleeves 54 at corresponding ends of each adjacent pair of rollers 38 are laterally offset. This arrangement is best illustrated in FIGS. 4, 5 and 8 in which the sleeves, herein referred to by the numeral 54', of each alternate roller 38 are positioned closely adjacent chains 36 while the sleeves, herein referred to by the numeral 54'', of each of the remaining rollers 38 are spaced inwardly from sleeves 54'. Sleeves 54' and 54'' along the upper belt run 48 are positioned so that all such sleeves 54' are arranged in one longitudinal line and all such sleeves 54'' are arranged in another longitudinal line. An elongated roller drive member 56 is secured to each upper flange 52 of plates 14. Each member 56 extends between shafts 24 and 26 with its lower end face 58 making frictional driving engagement with sleeves 54' carried by alternate rollers 38 in upper belt run 48. An elongated roller drive member 60 is secured to each lower flange 52 of plates 14. Each member 60 extends between shafts 24 and 26 with its upper end face 62 making frictional driving engagement with sleeves 54'' carried by the remaining rollers 38 in the upper belt run.

One end portion of shaft 24 extends outwardly from the plate 14 in which it is journaled and has a drive sprocket 64 mounted thereto. A motor 66, which is preferably electric, is mounted to frame 10 and has a sprocket 67 affixed to the motor drive shaft. An endless chain 68 is trained about sprockets 64 and 67. Activation of motor 66 causes a rotation of shaft 24 and its fixedly mounted sprockets 34. The rotation of sprockets 34 carried by shaft 24 causes the movement of chains 36, with the sprockets 34 carried by shafts 26 and 28 serving as idlers. The movement of chains 36, preferably in a counterclockwise direction as viewed in FIG. 3, carries rollers 38 connected thereto in a continuous path about sprockets 34. As the rollers 38 are carried along the upper run 48 of belt 46, sleeves 54 make frictional engagement with blocks 56 and 60 and thus cause axial rotative movement of the rollers 38 relative to chains 36. Due to the arrangement of roller drive members 56 and 60, each roller 38 along the upper run of the belt rotates in an opposite direction to the direction of rotation of the immediate roller on each side thereof, as shown in FIG. 6.

To operate the stemming device of this invention, the fruit, such as blueberries, is deposited upon the upper run 48 of belt 46 at the feed end 72 of the belt. Rollers 38 are preferably spaced apart with the spacing therebetween being slightly less than the thickness of the stems of the fruit which is deposited upon the belt. When the device is used for stemming blueberries, the rollers may be approximately one-half inch in diameter, with the spacing between rollers being preferably one sixty-fourth of an inch. The lineal speed of the belt 46 is preferably between 15 to 25 feet per minute. The berries are supported by those rollers 38 along upper belt run 48 and are carried from the feed end 72 to the discharge end 74 of the stemming device. A deflector 76 is mounted to each upper flange 52 of plate 14 and extends along the upper run of belt 46. Each deflector 76 terminates slightly above surface 70 of rollers 38 along upper belt run 48 and serves to prevent the fruit from rolling laterally off the upper run of the belt and becoming crushed between sleeves 54 and roller drive members 56 and 60.

Referring now to FIG. 6, as the fruit 78 is carried by the rollers 38 along the upper belt run 48 from the feed end 72 to the discharge end 74 of the stemming device, the axial rotative movement of the rollers relative to the chains 36 causes a rolling and shifting movement of the fruit. As fruit 78 shifts upon rollers 38, the stems 90 thereof are drawn between those pairs of rollers which turn inwardly toward each other and are pulled from the fruit. The stemless fruit then proceeds along the upper run of belt 46 until it reaches discharge end 74 where it falls into a trough 82. Various containers (not shown) may be positioned under trough 82 to catch the stemmed fruit. Surface 70 of each roller 38 between sleeves 54 is preferably smooth and may be in the form of a latex coating.

During the stemming operation some of the softer fruit may be pulled between rollers 38, thus causing the skin and pulp of the fruit and the juices thereof to cover portions of the rollers. The skin, pulp and juice matter from the crushed fruit not only causes additional fruit to be pulled and crushed between the rollers but it also contacts the other fruit upon the upper belt run and thereby makes it necessary to clean and dry the fruit after the stemming operation. To clean rollers 38 so as to remove the skins, pulp, juice and any stems adhering to the rollers, tank 16 is filled with a cleansing fluid 84, such as water. Shaft 28 and the sprockets carried thereby are positioned below the level of fluid 84 within tank 16 so that a portion of lower run 50 of belt 46 is carried through the fluid. Positioned above the fluid level in tank 16 and located between shafts 24 and 28, is a cylindrical sponge 90. Sponge 90 is supported and journaled in suitable brackets 92 connected to selected supports 32 of frame 10 and is drive connected by an endless chain 94 to another sprocket secured to the drive shaft of motor 66. Sponge 90 extends transversely of belt 46 and contacts rollers 38 along lower run 50. As motor 66 causes rotation of sponge 90, the sponge in turn contacts and causes the rotation of rollers 38 and thus absorbs the fluid picked up by the rollers in their path through the fluid 84 in tank 16. A wringer bar 96 is journaled to bracket 92 and parallels sponge 90. Bar 96 is pressed into engagement with sponge 90 and squeezes the roller absorbed fluid from the sponge which then drains into tank 16. A cylindrical brush 86 is journaled in suitable brackets connected to selected supports 32 and is positioned between shafts 26 and 28. Brush 86 is drive connected by an endless chain and sprocket combination 87 to sponge 90 and is positioned so that its bristles 88 engage surfaces 70 of rollers 38. Rotation of sponge 90 causes rotation of brush 86. Rotation of brush 86 causes rotation of the rollers 38 engaged thereby and the removal of any stems, skins or pulp in contact with the rollers. It is to be understood that brush 86 may be drive connected directly to motor 66. During operation of the stemming device, lower run 50 of belt 46 first contacts brush 86 to remove the skins, pulp, stems and other fruit matter from the rollers, then passes through cleansing fluid 84 contained within tank 16, and lastly is dried by sponge 90 before reaching the feed end 72 of the belt.

In FIG. 7, at least one and preferably a plurality of nozzles 98 are mounted above upper run 48 of belt 46. Nozzles 98 are connected to a compressed gas source 100 and are positioned to direct the gas, which may be air, onto the upper belt run 48. A valve 102 is positioned between compressed air source 100 and nozzles 98. Valve 102 is mechanically or electrically actuated by a switch 104. Switch 104 may be positioned adjacent one of the drive sprockets 34 carried by shaft 24 and may include a switch lever 106 which is positioned within the path of a trip 108 secured to shaft 24. On rotation of shaft 24, trip 108 engages lever 106 and causes switch 104 to actuate valve 102. Valve 102 is the type which upon actuation permits a burst of gas from compressed gas source 100 to pass through nozzles 98 and onto rollers 38 along upper run 48 of belt 46. These bursts of compressed gas cause movement of the fruit carried upon the upper run of the belt and thus assist the rollers in orienting the fruit so that the stems thereof are positioned to be drawn between the rollers and pulled from the fruit. In some applications of this invention it may be preferable to direct the bursts of gas upstream or against the path of movement of the fruit, as illustrated in FIG. 7, while in other applications of this invention it may be more advantageous to direct the bursts of gas downstream or with the direction of movement of the fruit. Additionally, it may be preferable to separately connect each nozzle 98 to compressed gas source 100 and separately regulate the flow of gas through each nozzle so as to vary the time duration and sequence of such flow through the nozzles.

Figure 9:
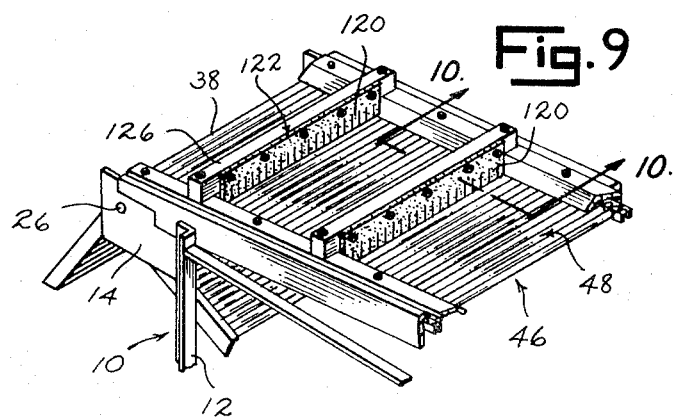
FIG. 9 is a fragmentary perspective view of a modification to the stemming device shown in FIG. 1.
Figure 10:
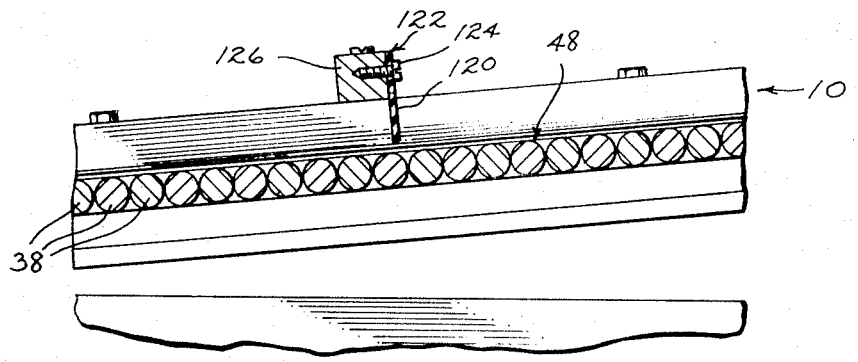
FIG. 10 is an enlarged sectional view taken along line 10—10 of FIG. 9.

In FIGS. 9 and 10, flaps 120 are located at or just above the upper run 48 of belt 46 so as to yieldably contact the fruit carried upon the upper run of the belt and thus assist the rollers 38 in orienting the fruit so that the stems thereof can be drawn between the rollers. Flaps 120 extend across frame 10 and are located in multiple rows along upper belt run 48. Each row of flaps 120 may constitute a rubber or similar flexible strip 122 which is secured by screws 124 at the upper margin to a transverse support 126 anchored at each end to frame 10. The lower margin of each strip 122 is cut into a plurality of strips which define flaps 120. The lower free end edge of each flap 120 may contact or be slightly spaced (as shown in FIG. 10) above rollers 38, depending upon the size and type of fruit. The spacing between flaps 120 and the rollers of the upper belt run should not exceed the transverse dimension of the fruit. In other embodiments of this invention, brushes can be substituted or used in conjunction with flaps 120.

It is to be understood that this invention is not to be limited to the details herein given but that it may be modified within the scope of the appended claims. One such modification would be to introduce a cleansing fluid in spray form upon the rollers extending along the lower run of the belt and allow the sprayed fluid to drain into tank 16 which would include a suitable drain to maintain the fluid therein at a selected level.

What I claim is:

1. A device for removing stems from fruit comprising: an endless power driven belt having upper and lower runs, said belt including a plurality of transversely extending parallel rollers defining a fruit conveying surface, means causing rotational movement of those rollers along the upper run of said belt wherein each such roller rotates in a direction opposite to the direction of rotation of the immediate such roller on each side thereof, said rollers along the upper belt run being adapted to support and carry said fruit from one end to the other end of said upper belt run, said rotational movement of the fruit supporting rollers adapted to cause the stems of said fruit to be received between said fruit supporting rollers and pulled from the fruit as the fruit progresses along said upper belt run, fruit contacting means located above said upper belt run for causing the stems of said fruit to be received between said fruit supporting rollers, said fruit contacting means constituting yieldable flap-like parts suspended in fixed locations above said upper belt run and having free ends terminating slightly above said upper belt run so as to contact said fruit as the fruit progresses from one end to the other end of said upper belt run.

2. A device for removing stems from fruit comprising an endless power driven belt having upper and lower runs, said belt including a plurality of transversely extending parallel rollers defining a fruit conveying surface, a frame, a pair of endless drive chains supported by said frame, said rollers extending between said chains and having the ends thereof rotatively connected to the chains, two pairs of stationary members paralleling and extending along said upper belt run, said pairs of stationary members located between said chains, one member of each pair of stationary members positioned over adjacent corresponding ends of said rollers, the other member of each pair of stationary members positioned over adjacent corresponding ends of said rollers, the other member of each pair of stationary members positioned under said adjacent corresponding roller ends, both of said one members of the pairs of stationary members making roller-driving contact with the same alternate rollers adjacently inwardly of said chains along said upper belt run and both of said other members of the pairs of stationary members making roller-driving contact with the same remaining rollers adjacently inwardly of said chains along said upper belt run whereby said alternate rollers will rotate in an opposite direction from the direction of rotation of said remaining rollers, said rollers being of one diametrical dimension between said stationary members and having axes of rotation equally spaced apart, said alternate and remaining rollers adapted to support and carry said fruit from one to the other end of said upper belt run and to cause the stems of the fruit to be received between adjacent alternate and remaining rollers and pulled from the fruit as the fruit progresses along said upper belt run, fruit contacting means located above said upper belt run for causing the stems of said fruit to be received between said rollers, said fruit contacting means constituting yieldable flap-like parts suspended in fixed locations above said upper belt run, said flap-like parts having free ends terminating slightly above said upper belt run so as to contact said fruit as the fruit progresses from one end to the other end of said upper belt run.

* * * * *

UNITED STATES PATENT OFFICE
CERTIFICATE OF CORRECTION

Patent No. 3,747,515            Dated  July 24, 1973

Inventor(s)  Emil Elias Pertics

It is certified that error appears in the above-identified patent and that said Letters Patent are hereby corrected as shown below:

Column 6, claim 2, lines 35 to 37, cancel "the other member of each pair of stationary members positioned over adjacent corresponding ends of said rollers".

Signed and sealed this 12th day of February 1974.

(SEAL)
Attest:

EDWARD M. FLETCHER, JR.            C. MARSHALL DANN
Attesting Officer                  Commissioner of Patents